UNITED STATES PATENT OFFICE.

HERMANN VON KELER AND ANTON WEINDEL, OF LEVERKUSEN, GERMANY, ASSIGNORS, BY MESNE ASSIGNMENTS, TO GENERAL CHEMICAL COMPANY OF NEW YORK, N. Y., A CORPORATION OF NEW YORK.

PROCESS FOR PRODUCING SULFURIC-ACID ANHYDRID ACCORDING TO THE CONTACT PROCESS.

1,102,670.  Specification of Letters Patent.  Patented July 7, 1914.

No Drawing.  Application filed June 23, 1913. Serial No. 775,368.

*To all whom it may concern:*

Be it known that we, HERMANN V. KELER and ANTON WEINDEL, doctors of philosophy, chemists, citizens of the German Empire, residing at Leverkusen, near Cologne-on-the-Rhine, Germany, have invented new and useful Improvements in Processes for Producing Sulfuric-Acid Anhydrid According to the Contact Process, of which the following is a specification.

In spite of all efforts to replace platinum as catalyzer in the $SO_3$ contact process this metal has proved to be indispensable. None of the many other contact substances proposed in such large numbers, for instance iron oxid in the shape of burnt pyrite, iron oxid impregnated with ferrous sulfate, oxids and sulfates or Cr, Ni, Co, Mn, U, Cu, oxygen compounds of Al, Be, Zr, Ce, Di, La, Th, Ti, Si, vanadic acid, phosphoric acid, metals and oxids of the tantalum group, iron superoxid+strontium oxid can be compared in its efficiency to platinum. The velocity of the reaction produced by these compounds does not suffice for an economical working of the contact process. Iron oxid alone of these catalyzers has been used to some extent in practice and this body in fact only in combination with platinum which converted into $SO_3$ the sulfurous acid remaining after the passage through the preceding iron oxid contact.

We have now found that silver vanadium compounds are eminently suitable for replacing the platinum in the $SO_3$ contact process. The excellent efficiency of this combination was the less to be expected as pure vanadic acid even when working very carefully allows at the best only a conversion of 84 per cent. of the $SO_2$ contained in the roaster gases into $SO_3$, and as on the other hand silver, silver oxid and silver sulfate have only a very small catalytic action on $SO_2$ and O. On replacing silver by other metals, such as Cu, Co, Ni, U, Ti, Di, etc., the capacity of conversion is in most cases even less than that of pure vanadic acid. The surprising catalytic effect obtained by the combinations of silver and vanadium is so excellent, that on using for instance an asbestos containing 20 per cent. of silver vanadate the sulfurous acid of the roaster gases is almost quantitatively oxidized to $SO_3$. The reaction does not depend on the use of a compound having a definite amount either of vanadium or of silver, this may vary within the widest limits. All possible kinds of contact supports can be used.

We claim:—

1. The process of subjecting a mixture of gases, capable of reacting under the influence of a catalytic, to the action of a contact substance comprising a contact support impregnated with a silver-vanadium compound.

2. The process of subjecting a mixture of gases, capable of reacting under the influence of a catalytic, to the action of a contact substance comprising an asbestos support impregnated with a silver-vanadium compound.

3. The process of subjecting a mixture of gases, capable of reacting under the influence of a catalytic, to the action of a contact substance comprising a contact support impregnated with silver vanadate.

4. The process of subjecting a mixture of gases, capable of reacting under the influence of a catalytic, to the action of a contact substance comprising an asbestos support impregnated with silver vanadate.

5. The process of subjecting a mixture of gases, capable of reacting under the influence of a catalytic, to the action of a contact substance comprising an asbestos support impregnated with about 20% silver vanadate.

6. The process of producing sulfuric-acid anhydrid from sulfur dioxid and oxygen which comprises subjecting a mixture of sulfur dioxid and oxygen to the action of a silver-vanadium compound as a contact substance.

7. The process of producing sulfuric acid anhydrid from sulfur dioxid and oxygen which comprises subjecting a mixture of sulfur dioxid and oxygen to the action of a silver-vanadium compound distributed upon a suitable support.

8. The process of producing sulfuric acid anhydrid from sulfur dioxid and oxygen which comprises subjecting a mixture of sulfur dioxid and oxygen to the action of a silver-vanadium compound distributed upon asbestos.

9. The process of producing sulfuric acid anhydrid from sulfuric dioxid and oxygen which comprises subjecting a mixture of sulfur dioxid and oxygen to the action of silver vanadate as a contact substance.

10. The process of producing sulfuric acid anhydrid from sulfuric dioxid and oxygen which comprises subjecting a mixture of sulfuric dioxid and oxygen to the action of silver vanadate distributed upon a suitable support.

11. The process of producing sulfuric acid anhydrid from sulfuric dioxid and oxygen which comprises subjecting a mixture of sulfuric dioxid and oxygen to the action of silver vanadate distributed upon asbestos.

In testimony whereof we have hereunto set our hands in the presence of two subscribing witnesses.

HERMANN von KELER. [L. S.]
ANTON WEINDEL. [L. S.]

Witnesses:
HELEN NUFER,
ALBERT NUFER.